(No Model.) 2 Sheets—Sheet 2.
J. ASHTON.
ROUNDABOUT.
No. 603,099. Patented Apr. 26, 1898.
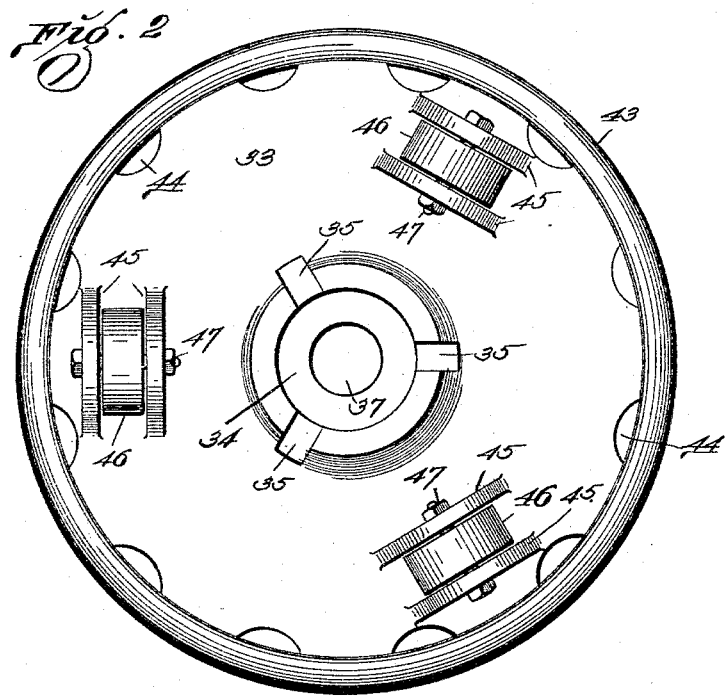
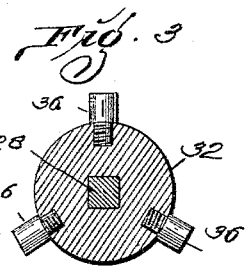
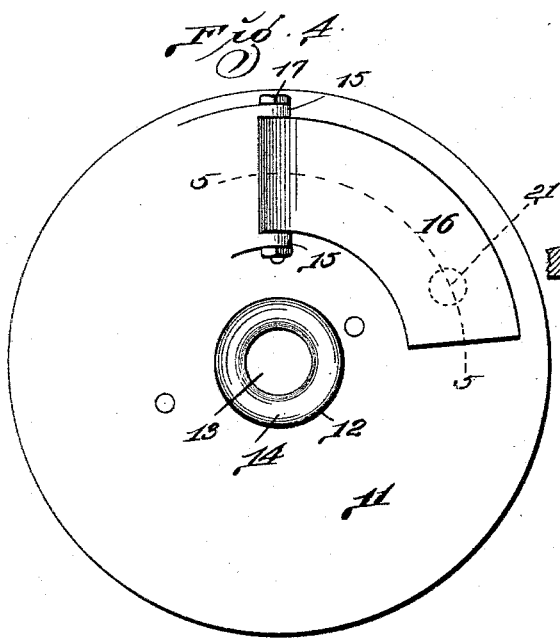
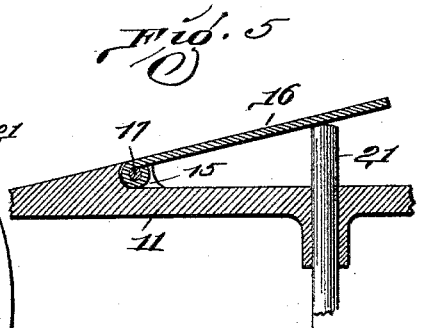
Attest:
W. P. Smith
A. J. McCauley
Inventor:—
John Ashton:—
By Higdon, Longan & Higdon
Attys.

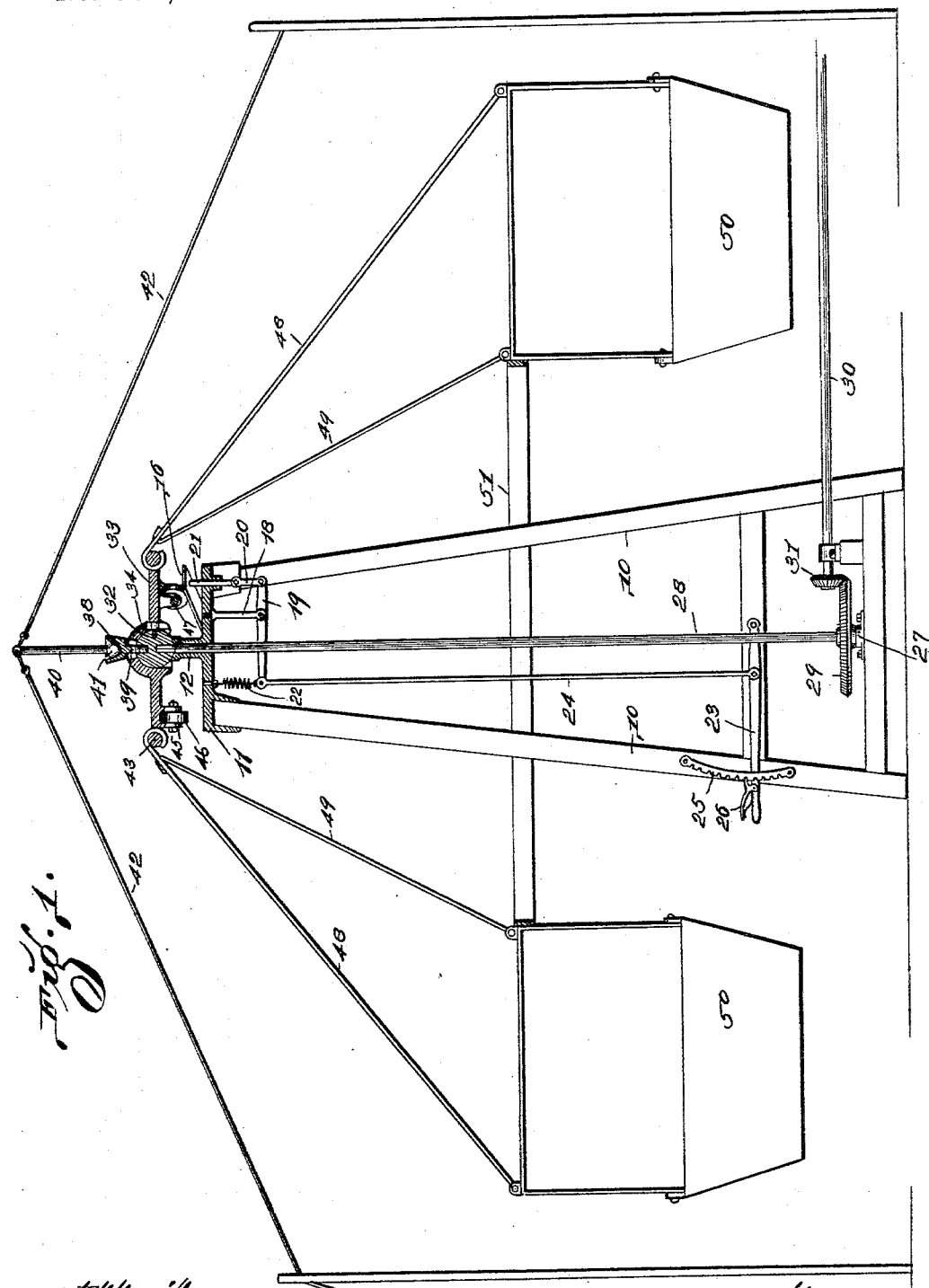

UNITED STATES PATENT OFFICE.

JOHN ASHTON, OF ST. LOUIS, MISSOURI.

ROUNDABOUT.

SPECIFICATION forming part of Letters Patent No. 603,099, dated April 26, 1898.

Application filed July 23, 1897. Serial No. 645,713. (No model.)

*To all whom it may concern:*

Be it known that I, JOHN ASHTON, of the city of St. Louis, State of Missouri, have invented certain new and useful Improvements in Roundabouts, of which the following is a full, clear, and exact description, reference being had to the accompanying drawings, forming a part hereof.

My invention relates to roundabouts; and it consists of the novel construction, arrangement, and combination of parts herein shown, described, and claimed.

Figure 1 is a vertical central section of a roundabout constructed in accordance with my invention. Fig. 2 is a bottom plan view of the rotating plate which carries the carriages. Fig. 3 is a horizontal section of the ball or head which operates in the socket shown in the center of the rotating plate. Fig. 4 is a top plan view of the supporting-plate, which is located immediately below the rotating plate. Fig. 5 is a vertical section through the supporting-plate and taken approximately on the line 5 5 in Fig. 4.

Referring by numerals to the drawings, the posts 10 are placed in vertical positions and framed together, thus forming a tower. The supporting-plate 11 is placed in a horizontal position and attached to the upper ends of the posts 10. The bearing 12 extends upwardly from the center of the supporting-plate 11. The vertical opening 13 is formed through the bearing 12 and through the supporting-plate 11, and a concave recess 14 is formed in the upper end of the bearing. A pair of ears 15 extend upwardly from the plate 11, said ears being horizontally perforated on a radial line relative to the center of the supporting-plate. The track-plate 16 is substantially a quarter of a circle in plan, and one of its ends is placed between the ears 15 and secured in position by means of the bolt 17, inserted through said ears and through the end of said track-plate, as required to form a hinged connection between the track-plate and the supporting-plate. An arm 18 extends downwardly from the supporting-plate. A lever 19 is pivotally connected to the lower end of the arm 18 in a horizontal position. A link 20 is attached to the short end of the lever 19, and a bolt 21 is slidingly mounted through the plate 11 and connected to the upper end of the link 20. The free end of the track-plate 16 rests upon the upper end of the sliding bolt 21. A retractile coil-spring 22 is attached to the long end of the lever 19, as required to hold the bolt 21 normally depressed. A hand-lever 23 is attached to the tower, and a connecting-rod 24 connects the lever 19 with the lever 23. The rack 25 is attached to the tower, and a pawl 26 upon the hand-lever 23 engages said rack, as required to hold the bolt 21 adjustably in position. The free end of the track-plate 16 is raised and lowered by operating the hand-lever. A bearing 27 is mounted in vertical alinement with the bearing 12, and the shaft 28 is mounted in said bearings. A bevel-gear 29 is fixed upon the lower end of the shaft 28. A shaft 30 is mounted in a horizontal position and has a bevel-gear 31, fixed upon one of its ends, in mesh with the bevel-gear 29. The shaft 30 communicates with the source of motive power.

A ball-shaped head 32 is mounted upon the upper end of the shaft 28 and rests in the recess 14. The rotating plate 33 rests upon the head 32. The plate 33 is circular in plan and has a socket 34 at its center in which the head 32 operates. Slots 35 are formed in the wall of the socket 34 upon radial lines, and the pins 36 project horizontally from the head 32 and operate in said slots 35, as required to rotate the plate 33 when the shaft 28 is rotated, and as required to rotate the carriages, and as required to form a rocking connection between the plate and the shaft. A vertical opening 37 is formed through the wall of the socket 34, and the socket 38 has a stem 39 extending downwardly through said opening 37 and screw-seated in the head 32, the opening 37 being considerably larger than the stem 39 as required to allow the plate 33 to rock. A rod 40 has a head 41, mounted in the socket 38, and said rod forms the center pole of the tent, its upper end being supported by the guy-ropes 42. A bead or ring 43 is formed upon the outer edge of the rotating plate 33, and openings 44 are formed through said plate inside of said ring 43. Pairs of ears 45 project downwardly from the plate 33, and the rollers 46 are mounted between said ears to rotate upon the shafts formed by the bolts 47, inserted horizontally through said ears and through said rollers. The rollers 46 are in position to engage the track-plate 16. The upper ends of the bars 48 are hooked through the openings 44 and around the ring 43. The upper ends of the bars 49 are hooked into the upper ends of the bars 48, and the carriages 50 are attached to the lower ends of the bars 48 and 49. The ring 51 is mounted in a horizontal position and attached to the carriages 50, as required to spread the carriages and hold them away from the tower.

When the shaft 28 is rotated, the carriages travel in a circle. When the bolt 21 is depressed, the carriages travel in a horizontal plane, and when the bolt 21 is elevated to elevate the free end of the track-plate 16 an undulatory motion is imparted to the carriages.

I claim—

1. In a roundabout, a vertical shaft, a ball-shaped head removably mounted upon said shaft, a rotating plate having a socket to receive said head, in which socket-wall are formed slots, pins projecting from said head into said slots, a second socket fixed to the ball-shaped head and extending upwardly through the first-mentioned socket, a center post removably seated in said second socket, guy-ropes attached to the upper end of said center post and carriages attached to and carried by the rotating plate, substantially as specified.

2. In a roundabout, the combination of a suitable framework, a shaft arranged to rotate vertically in said framework, a horizontal rotating plate, a ball-and-socket connection between said shaft and said plate, rollers carried by the under side of said plate, pins projecting from the ball into slots formed in the socket, a second socket seated in the ball and extending upwardly through the first-mentioned socket, a center post removably seated in said second-mentioned socket, guy-ropes attached to the upper end of said center post, and the vertically-adjustable track-plate secured to the frame below the rotating plate, substantially as specified.

3. In a roundabout, a vertical rotating shaft, a ball-shaped head upon said shaft, a horizontal rotating plate, a socket attached to said plate to receive said head, a socket attached to said head and extending upwardly through the first-mentioned socket and a center pole mounted with its lower end in the last-mentioned socket, substantially as specified.

4. In a roundabout, a rotating plate, rollers under said plate, a track-plate pivotally mounted under said rollers, and means of raising and lowering one end of said track-plate, substantially as specified.

5. In a roundabout, a suitable frame, a track-plate pivotally mounted at one of its ends upon said frame, means of raising and lowering the free end of said track-plate, a vertical rotating shaft, a ball-shaped head upon said shaft, a plate mounted upon said head, connections between said head and said plate as required to allow the plate to rock and prevent the head from rotating independent of the plate, and rollers under said plate and engaging said track-plate, substantially as specified.

In testimony whereof I affix my signature in presence of two witnesses.

JOHN ASHTON.

Witnesses:
S. G. WELLS,
ALBERT J. MCCAULEY.